(12) United States Patent
Porter

(10) Patent No.: US 7,878,153 B2
(45) Date of Patent: Feb. 1, 2011

(54) CONFINING ANIMAL TRAINING DEVICE AND METHODS OF USE

(76) Inventor: Robert Russell Porter, 5220 S. County Rd. 157, Strasburg, CO (US) 80136

( * ) Notice: Subject to any disclaimer, the term of this patent is extended or adjusted under 35 U.S.C. 154(b) by 859 days.

(21) Appl. No.: 11/682,178

(22) Filed: Mar. 5, 2007

(65) Prior Publication Data

US 2008/0216764 A1 Sep. 11, 2008

(51) Int. Cl.
*A01K 1/08* (2006.01)
*A01K 1/00* (2006.01)
*A01K 37/00* (2006.01)

(52) U.S. Cl. .................... 119/772; 119/416; 119/712

(58) Field of Classification Search ............. 119/496, 119/497, 671, 678, 772, 707; 49/25; 441/78
See application file for complete search history.

(56) References Cited

U.S. PATENT DOCUMENTS

| | | | |
|---|---|---|---|
| 3,749,064 A * | 7/1973 | Weinstein et al. ........... 119/664 |
| 4,010,880 A | 3/1977 | Guillot-Munoz | |
| 4,149,492 A | 4/1979 | Kovacs | |
| 4,579,336 A * | 4/1986 | Morin ....................... 280/206 |
| 5,269,260 A | 12/1993 | Farrell et al. | |
| 5,277,148 A | 1/1994 | Rossignol et al. | |
| 5,309,866 A * | 5/1994 | Santoro ..................... 119/650 |
| 5,373,812 A * | 12/1994 | Garcia Lopez ............. 119/671 |
| 5,419,281 A | 5/1995 | Williams et al. | |
| 6,394,036 B2 * | 5/2002 | Burns et al. .................. 119/497 |
| 6,394,039 B1 * | 5/2002 | Grauer ....................... 119/712 |
| 6,446,577 B1 * | 9/2002 | Salahor ...................... 119/497 |
| 6,553,708 B1 | 4/2003 | Wolf | |
| 6,701,871 B1 | 3/2004 | Johnson | |
| D501,063 S | 1/2005 | Bertoli et al. | |
| D520,190 S | 5/2006 | Joyner | |
| 7,392,764 B2 * | 7/2008 | Saavedra et al. ............ 119/497 |
| 2003/0046855 A1 | 3/2003 | Bergdall | |
| 2003/0127059 A1 * | 7/2003 | Smith et al. ................. 119/496 |
| 2004/0231221 A1 | 11/2004 | Latschaw | |
| 2006/0169218 A1 * | 8/2006 | Chang ........................ 119/496 |

* cited by examiner

*Primary Examiner*—Timothy D Collins
*Assistant Examiner*—Monica Williams
(74) *Attorney, Agent, or Firm*—Leyendecker & Lemire, LLC

(57) ABSTRACT

An animal training device that can be used to confine an animal during training, as well as methods for its use, is described. Embodiments of the present invention comprise a marginally unstable base that makes the device prone to rocking or toppling when physically disturbed by the movement of an animal in the device. Animals usually find the rocking or toppling unpleasant. An advantage of the animal training device is that an animal receives negative feedback from its undesirable behavior (excessive movement in or straining against the device) in the absence of disciplinary action by a human trainer. Additional advantages of the confining animal training device include, but are not limited to, reducing physical stress on a human trainer and decreasing the time required to train an animal.

13 Claims, 7 Drawing Sheets

CONFINING ANIMAL TRAINING DEVICE AND METHODS OF USE

FIELD OF THE INVENTION

The present invention relates generally to devices for training animals, especially training dogs for hunting.

BACKGROUND

Conventional leash and collar animal training techniques, especially for training hunting dogs, typically involve a great deal of restraining and controlling an animal by applying tension to a leash attached to the animal. The amount of tension an animal trainer or handler must apply to the leash can be sizeable, requiring the handler to strain against the leash to exert control. This phenomenon can be problematic, particularly where a relatively small, frail, or physically impaired handler is working with an animal that is relatively large or strong.

In addition, animals sometimes respond poorly to corrective measures administrated by a human handler, especially where the handler is over-zealous or poorly trained. Such animals can become averse to human handling or correction, and may develop excessively submissive, aggressive, or otherwise untoward behavior regarding their human handlers. The risk of undesirable results is exacerbated when potentially harsh training devices such as shock collars are used. Even relatively benign training aids such as the Gentle Leader® Headcollar, which is effective at reducing excessive pulling by dogs on a leash, should be used cautiously and require close attention by the handler.

Training tables, which are commonly used for training dogs, are typically large and cumbersome, and therefore are generally not portable. Moreover, training tables still require that a human handler administer corrective measures that may cause an animal to develop a negative attitude toward its handler and other people.

Animal training using conventional techniques is also usually very time consuming; achieving a highly trained state in a hunting dog typically takes 3 months or more of intensive training. And certain behavior, such as getting a dog to consistently sit or stand facing a particular direction, or getting a pointing dog to stand while awaiting further command, can be especially difficult and time consuming to teach an animal.

DETAILED DESCRIPTION

Figure 1:
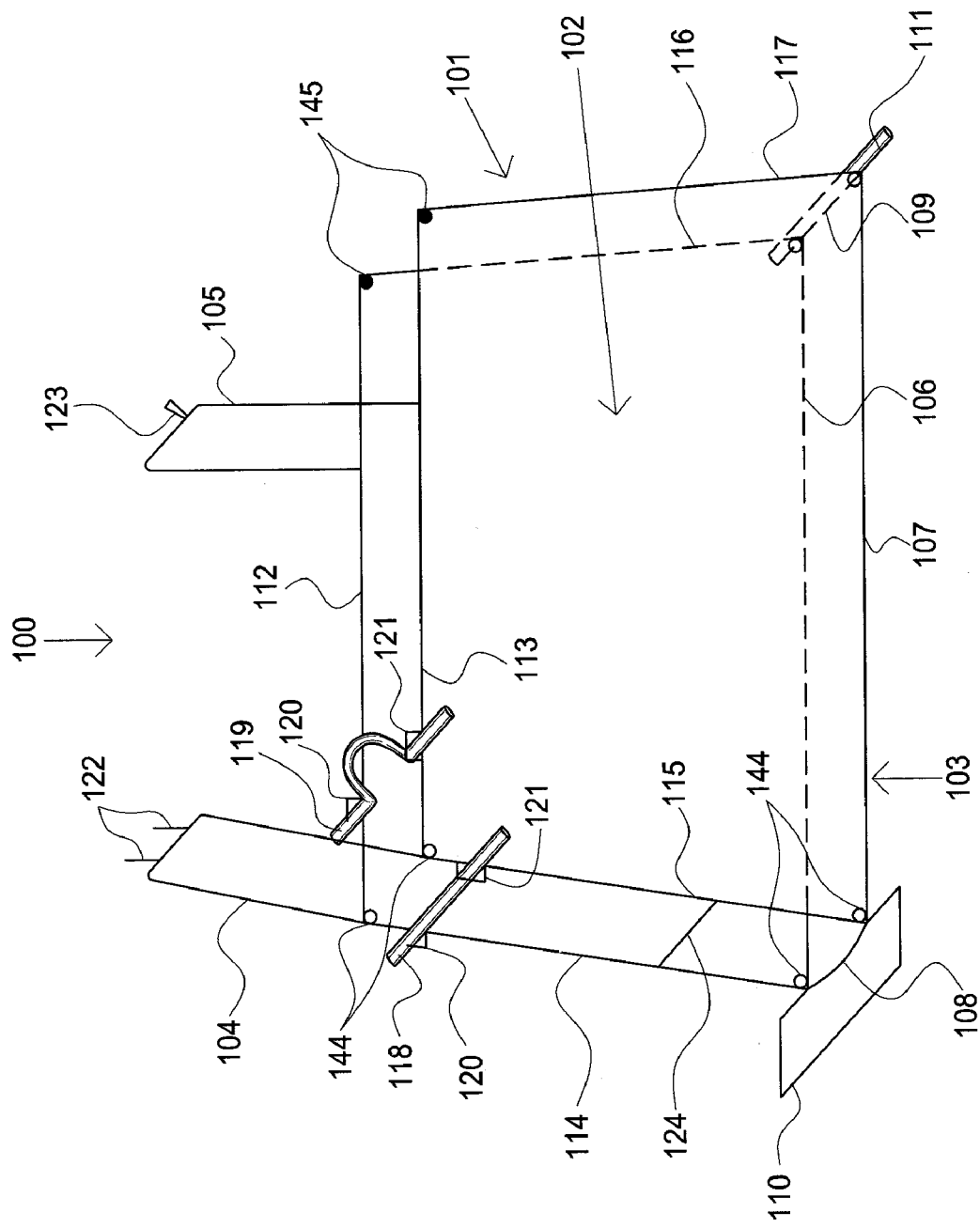
FIG. 1 is an isometric view of an animal training device according to one embodiment of the present invention.

Embodiments of the present invention include an animal training device comprised of a substantially rigid frame that defines a containment cavity designed to contain an animal. The animal is typically, but not necessarily, a dog. The substantially rigid frame typically defines part or all of a periphery of the containment cavity. Embodiments of the substantially rigid frame comprise a substantial entirety of one or more of the sides of the containment cavity, with little or no open space among the substantially rigid frame material on that side. Conversely, in some embodiments, the substantially rigid frame is open sided. An open sided substantially rigid frame comprises frame material only along the edges of one or more sides of a containment cavity; consequently, a substantial gap, where frame material is absent, exists between frame material that runs along the edges of the sides. The gaps are typically, but not necessarily, spanned by a frame cover that further encloses the containment cavity and defines its perimeter.

Embodiments of the frame cover affix to the substantially rigid frame by use of temporary fasteners such as, but not limited to, snaps, hooks, zippers, buttons, and Velcro™ or other hook and loop fastening devices. Some embodiments use more permanent fasteners, and some variations suspend the frame cover from the substantially rigid frame without using fasteners. In some embodiments, part or all of the frame cover is composed of substantially supple material. Other variations of frame covers are substantially rigid. Some variations of the frame cover are breathable, and some variations are water-resistant or waterproof. Examples of frame cover material include, but are not limited to, fabric, woven fabric, non-woven fabric, flexible polymeric material, polymeric sheet material, Gore-Tex®, burlap, canvas, nylon, Tyvek®, composites, sheet metal, and plywood.

In some embodiments, the front side, top side, or rear side of the containment cavity is partially or fully covered by the frame cover, in which case the frame cover on those sides is an aperture cover. The portions of the frame cover that serve as aperture covers are typically affixed to the substantially rigid frame by use of temporary fasteners, and are fully or partially removable to allow ingress and egress by the animal. Typically, but not necessarily, ingress into the containment cavity is through the rear side of the rigid frame, and egress is through the front side. Other times, typically where the rear side of the rigid frame is blocked by the aperture cover or a closure, both ingress and egress are through the front side of the containment cavity.

Variations of the rigid frame further comprise one or more closures that open or close to allow or restrict, respectively, access to the containment cavity. In some variations, the open position of the closure is achieved by removing the closure from the rigid frame. A typical embodiment of the present invention, when configured with the frame cover fully or almost fully attached to the rigid frame and the closures closed, so as to restrict ingress and egress to the containment cavity, includes a head aperture through which an animal in the containment cavity can extend its head outside the containment cavity.

Some embodiments comprise a marginally unstable base on which the rigid frame sets. The marginally unstable base makes the animal training device predisposed to rocking when physically disturbed. So configured, the animal training device rocks when physically disturbed by the movement of an animal in the containment cavity, or by efforts to escape by the animal. More extreme movement or escape efforts by the animal cause the animal training device to topple. Animals usually find the rocking unpleasant, and the toppling more so, and quickly learn to avoid unpleasant sensation by holding relatively still when in the containment cavity. The marginally unstable base is typically, but not necessarily, integral to and continuous with the rigid frame. In some variations, the marginally unstable base is physically or conceptually separable from the rigid frame.

Embodiments of the present invention further comprise one or more upper structural members, at least a portion of which extends above the top side of the containment cavity. Typically, the frame cover attaches to the rigid frame beneath the portion of the upper structural member that extends above the containment cavity; the frame cover therefore does not typically cover the upper structural members in any configuration of the animal training device.

In some embodiments, the animal training device further comprises one or more leash guides that are typically disposed on, or are part of, an upper structural member. The leash guides facilitate configuring an animal leash effectively for activities such as leading, controlling, restraining, or training an animal in or near the animal training device. Embodiments of leash guides include posts, bushings, or pulleys around or through which the animal leash passes.

Some embodiments include a remote release mechanism that enables a trainer located distal to the containment cavity to release an animal from the animal training device. Variations of the remote release mechanism include a cable that runs from the distal location to the body of the animal training device. Typically, the remote release mechanism comprises a receiver proximate the containment cavity, and a transmitter adapted to transmit a signal from a location distal to the containment cavity. In some variations, the remote release mechanism comprises a clasp, attached to a lead or leash that affixes to the animal training device, that disengages from the animal's collar or harness upon command from the transmitter. Embodiments of the present invention also include a remote release mechanism that opens a front or top closure upon command from the transmitter, to permit egress from the containment cavity by an animal.

Some embodiments use a remote release mechanism to release a fastener adapted to holding a belly sling in place beneath an animal's abdomen. Variations of the remote release mechanism wirelessly transmit a signal from the transmitter to the receiver. The wirelessly transmitted signal is typically comprised of electromagnetic radiation.

Some embodiments include one or more backpack style shoulder straps or a waist belt, to facilitate carrying the animal training device on the user's back. The shoulder straps and waist belt facilitate animal training device portability.

Embodiments of the present invention typically offer one or more of the following advantages:

Less physical stress is transmitted to a human trainer than with conventional leash and collar work; some of the physical stress is transmitted to the animal training device, and other stress is eliminated entirely, or greatly reduced, as described below. Reduced stress transmission is especially desirable where a human trainer is relatively small, frail, or physically impaired, or where an animal is relatively large or strong.

An animal contained in the device quickly learns that excessive movement results in instability (rocking of the device) that the animal finds unpleasant. The animal therefore refrains from uncooperative activities, such as pulling, straining, or lunging. With conventional leash and collar training methods, a human trainer would typically need to constrain such activities by disciplinary action, including application of force to the leash.

An animal on which the animal training device is used learns to associate negative reinforcement (the unpleasant sensation of instability) with the animal's own undesirable behavior, without associating the negative reinforcement with action by a human trainer. The animal therefore avoids developing a negative attitude toward the human trainer. The disadvantages of an animal having a negative attitude toward its human trainer are obvious to one of ordinary skill in the art.

An animal on which the animal training device is used also learns that it can not misbehave with impunity when the human trainer is distracted or otherwise inattentive; the animal quickly learns that it can not misbehave "behind the back" of the human trainer.

In the care of a skilled and knowledgeable trainer, dogs typically train more quickly using the present invention as a training tool than without the animal training device.

In contrast to harsh training devices and techniques, a dog is unlikely to be traumatized or damaged by training attempts with the animal training device in the hands of an unskilled trainer.

The animal training device can be adjusted to train dogs to sit, or to encourage them stand, while awaiting further command. The capacity to encourage animals to stand is desirable in training pointing dogs for hunting, whereas retrievers are generally trained to sit while awaiting further command.

The animal training device is portable and can be carried on the user's back, and can therefore be readily transported into the field. Being portable, the animal training device can be loaded with decoys or other items to facilitate hauling the decoys or other items into the field.

The animal training device can act as a portable blind by serving to provide camouflage for an animal.

The animal training device can be used to teach a dog to face a particular direction while sitting or standing in anticipation of further command from a human handler.

The animal training device is adapted for use with animals across a large range of sizes.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply regardless of the word or phrase's case, to the singular and plural variations of the defined word or phrase.

The term "or" as used in this specification and the appended claims is not meant to be exclusive; rather the term is inclusive, meaning "either or both".

References in the specification to "one embodiment", "an embodiment", "another Embodiment", "a preferred embodiment", "an alternative embodiment", "one variation", "a variation" and similar phrases mean that a particular feature, structure, or characteristic described in connection with the embodiment or variation, is included in at least one embodiment or variation of the invention. The phrases "in one embodiment", "in one variation" or similar phrases, as used in various places in the specification, are not necessarily meant to refer to the same embodiment or the same variation.

The term "marginally unstable" refers to a tendency to stay upright when undisturbed, combined with a tendency to rock when mildly physically disturbed. Thus an animal training device with a marginally unstable base stays upright and still where a dog contained within the device remains relatively still, but rocks if the dog moves about.

The term "breathable" means relatively highly permeable to air. As used herein, material such as burlap, cotton, Gore-Tex, and most woven fabrics are breathable.

The terms "contain, contains, and contained" refers to fitting most of an animal's body within a space defined by a peripheral structure, in this case a containment cavity defined by a substantially rigid frame. As defined herein, an animal's head may extend outside the cavity where the animal is still "contained" in the cavity. The same principle applies where one or more of an animal's extremities extend from the cavity; so long as most of the animal's body is within the cavity, the animal is "contained" within the cavity.

The terms "rock, rocks, and rocking" refers to movement of a structure on a surface, alternately among two or more orientations, the two or more orientations being relatively similar and at the extremes of a relatively unrestricted range of motion along at least one axis. Relatively little energy is required to move from one orientation to another within that unrestricted range. As an example, a four legged, square table where one leg is ¼" longer than the others "rocks" between two extreme positions, each extreme characterized by three of the four legs resting on a floor, and the relatively unrestricted motion occurring where only two of the four legs are touching the floor.

The term "topple, topples, or toppling" refers to the animal training device tipping over from an upright orientation (where the device rests on its bottom side), to another relatively stable orientation (where the device rests on a side other than the bottom side).

The term "mildly physically disturbed" refers to the state of having relatively small physical force applied. Where a dog moves or changes position in the containment cavity of the animal training device, and thereby changes the distribution of force on the base of the device, or bumps the substantially rigid frame of the device, the device is mildly physically disturbed. Such mild physical disturbance would not alter the orientation of the device if the device had a substantially flat, stable base resting on a relatively regular, substantially horizontal surface. Where the animal training device has a marginally unstable base, such mild physical disturbance is sufficient to cause the device to rock.

The term "supple" refers to being easily folded, bent, or crumpled. Common woven fabrics such as cotton or silk cloth are supple, as are sheets of very thin polyethylene such as food wrap. Corrugated cardboard, polycarbonate sheets, or sheet metal are typically not supple.

The term "remote release mechanism" refers to a mechanism that permits a trainer, located distal to the containment cavity of the animal training device, to alter the position or configuration of a component of the animal training device typically used to restrain an animal. Examples of altering a position or configuration include, but are not limited to, releasing or disconnecting a fastener adapted to securing an animal's collar, releasing or disconnecting a fastener adapted to securing a belly sling beneath an animal's abdomen, or changing the position of a front or top closure. A remote release mechanism is typically used to facilitate releasing an animal from confinement in or near the containment cavity.

As is obvious to one of ordinary skill in the art, a wireless remote release mechanism typically comprises a transmitter controlled by a human operator, and a receiver that responds to a signal emitted by the transmitter. The receiver typically responds by actuating a servomechanism such as, but not limited to, a motor or a solenoid, to open a clasp or alter the position of a closure. A wireless remote release mechanism typically emits an electromagnetic signal from the transmitter that is detected by the receiver, which consequently actuates a servomechanism.

The term "closure or closures" refers to an adjustable device or assembly that has a plurality of positions or orientations, at least one of which substantially impedes or blocks access to or from the containment cavity of the animal training device, and at least one of which does not impede or block access to or from the containment cavity.

The term "removable" refers to a member or component that is readily removed or detached from the animal training device, and that is typically repeatedly attached to and removed from the animal training device in the course of ordinary operation and use of the device.

The term "temporary fasteners" refers to a device designed to repeatedly engage and disengage to fasten two items together in such a way that they are readily, and repeatedly, separable. Examples of such devices include, but are not limited to, snaps, buttons/button holes, hooks, and hook and loop fasteners such as Velcro®.

The term "body of the animal training device" refers to the substantially rigid frame or the enclosure, within which the containment cavity substantially resides.

The term "variable angle junction" or "variable angle junctions" refers to devices that enable adjacent components, attached to each other via the variable angle junction, to align at various angles relative to each other or to disconnect from each other. Such devices include, but are not limited to, hinges and similar connecting devices with pivots or axles. Variable angle junctions are typically, but not necessarily, disposed on the body of the animal training device to enable the device to fold or change shape.

A First Embodiment Animal Training Device

A first embodiment animal training device 100 is illustrated in FIG. 1. The first embodiment animal training device comprises an open sided substantially rigid frame 101 that defines a containment cavity 102. The substantially rigid frame 101 has a marginally unstable base 103. The first embodiment further comprises a front upper structural member 104 and a rear upper structural member 105. Leash guides 122 are disposed on the front upper structural member, and a leash clasp 123, adapted to securing a leash at one or more points along the leash's length, is disposed on the rear upper structural member.

The front upper structural member 104 in this embodiment is not positioned directly in line with the left and right front upright frame members 114, 115, but is angled more toward the rear of the animal training device, as shown in FIG. 1. Thus the front upper structural member forms angles at its junctions with the left and right front upright frame members. In some embodiments, the angles formed between the front upper structural members and the left and right front upright frame members along the front side of the device is greater than 180 degrees but less than 225 degrees. An angle between 190 and 200 degrees is particularly effective for holding a dog in the proper position with a leash or other restraining device that runs between the front upper structural member and the dog's collar. Other embodiments in which the angles between the front upper structural member and the left and right front upright frame members along the front side of the animal training device are less than or equal to 180 degrees are also contemplated.

The marginally unstable base 103 of the first embodiment is integral to and continuous with the substantially rigid frame 101, and comprises a left longitudinal base member 106, a right longitudinal base member 107, a front lateral base member 108 and a rear longitudinal base member 109. In some embodiments, either or both of the front and rear longitudinal base members are downwardly bowed to impart marginal instability to the animal training device. The marginal instability in this embodiment manifests as a tendency to rock when the animal training device is mildly physically disturbed, typically occurring when an animal in the containment cavity 102 moves or stirs. Typically, the tendency of the animal training device to rock is mitigated by a front stability modulator 110 and a rear stability modulator 111.

In some embodiments, stability modulators are removable and replaceable, and stability modulators that have varying effectiveness are used interchangeably to adjust stability. Other types of stability modulators are contemplated, such as, but not limited to, stability modulators that employ weights affixed to the animal training device at appropriate positions. The weights in some embodiments are removable. The stability modulators 110, 111 illustrated in FIG. 1 modulate stability by changing the area of the base of the animal training device. In some embodiments, stability modulators modify stability by altering the center of gravity or distribution of weight of the animal training device.

The substantially rigid frame 101 in this embodiment comprises a left longitudinal frame member 112, a right longitudinal frame member 113, a left front upright frame member 114, a right front upright frame member 115, a left rear upright frame member 116, and a right rear upright frame member 117. This substantially rigid frame further comprises a front closure 118, a top closure 119, and a foot boundary bar 124. The top closure in this embodiment has a center section that is upwardly curved to more readily accommodate an animal positioned beneath the closure; other shapes, including, but not limited to a substantially straight top closure, are also contemplated. The front and top closures are removably mounted on the front upright frame members and the longitudinal frame members, respectively, and are illustrated in FIG. 1 in their closed (attached) position. The front and top closures mount to the frame members by use of open hook 120 and closed insertion 121 mounting devices. In the first embodiment, the closures are placed in the open position by removing the closures from the mounting devices.

Other mounting devices contemplated include, but are not limited to, hinges, clasps, bolts, hooks, and straps. Some embodiments permit the closures to alternate between the open and closed positions without the closures detaching from both of the mounting devices. Remote release mechanisms that enable a user to operate one or more closures from a location distal to the containment cavity of the animal training device, in order to move the closure from one of the open or closed positions to the other of the open or closed positions, are also contemplated.

The first embodiment further comprises variable angle junctions 144 at the junctions of some substantially rigid frame components. The first embodiment also comprises separable junctions 145 that allow the longitudinal frame members (left 112 and right 113) to disconnect from the rear upright frame members (left 116 and right 117) at the separable junctions. Separable junctions include, but are not limited to, junctions reversibly secured by bolts, screws, pins, cotter pins, or cammed pins that extend through slots or holes in substantially rigid frame members.

The substantially rigid frame 101, the marginally unstable base 103, the front and rear stability modulators 110 and 111, the front and rear upper structural members 104 and 105, and the front and rear closures 118 and 119, are typically comprised of components that are substantially rigid in at least one plane, such as, but not limited to, sheets, tubes, channels, angles, bars, rods, and roto-molded, injection molded, and laminated structures. The substantially rigid components are typically comprised of material such as, but not limited to, metals, metal alloys, polymers, copolymers, composites, carbon fiber, wood, thermoplastics, or epoxies. Some embodiments use combinations of multiple types of components or multiple types of materials. Embodiments of the different components are joined at junctions by use of connecting devices such as, but not limited to, welds, lugs, bolts, screws, hinges, adhesives, epoxides, dowels, rivets, or pins. Some variations have different components formed by one or more continuous pieces of material, such that some junctions and connecting devices are unnecessary. Examples include, but are not limited to, a right longitudinal frame member 113 and a right front upright frame member 115 comprised of one continuous metal tube or one continuous piece of composite material that is bent or curved where the two members meet.

A Second Embodiment Animal Training Device

Figure 2:
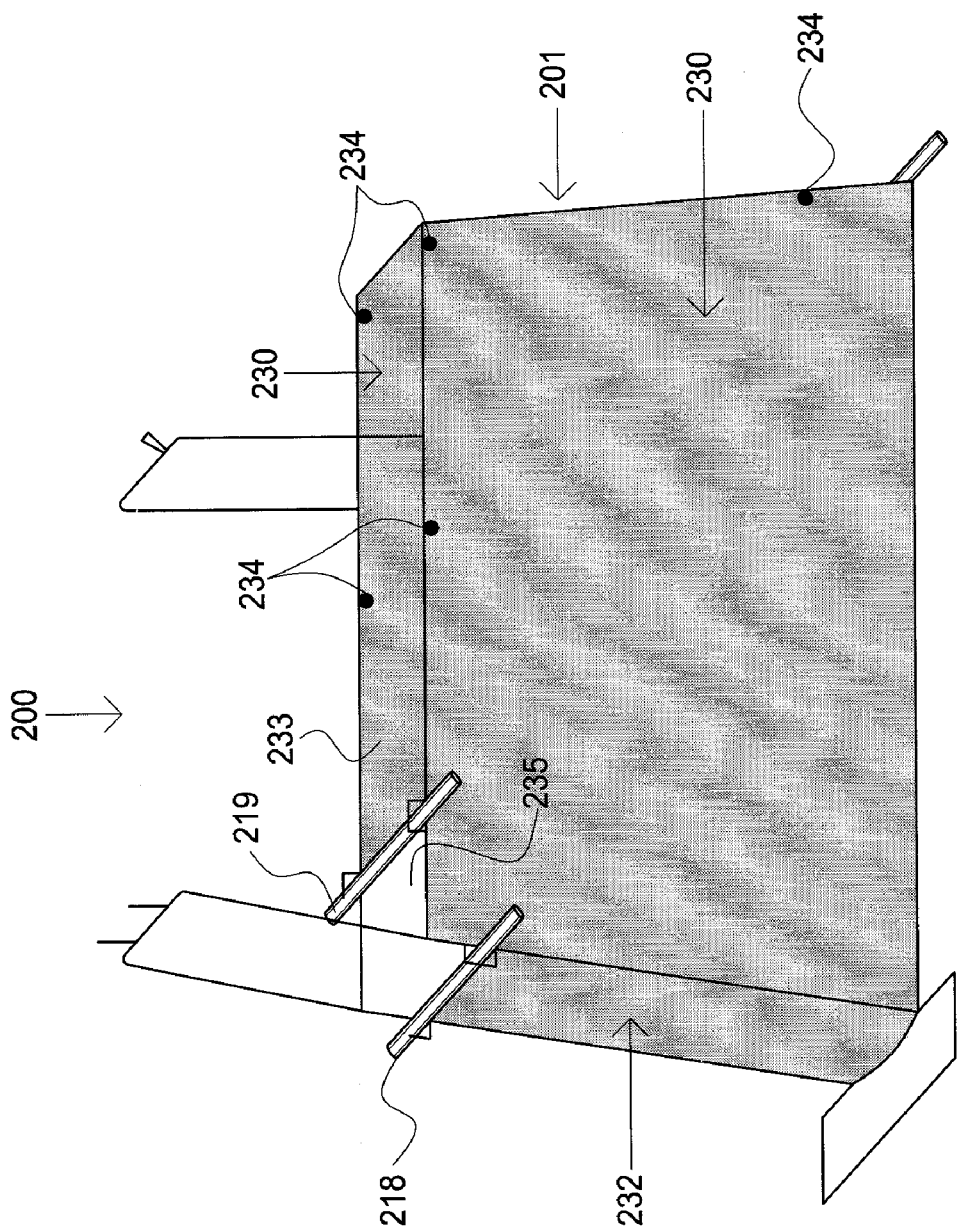
FIG. 2 is an isometric view of an animal training device with the frame cover fully attached and closures in the closed position, according to one embodiment of the present invention.

FIG. 2 illustrates a second embodiment animal training device 200 with the frame cover 230 fully attached to the substantially rigid frame 201, with the front closure 218 and the top closure 219 in the closed position. The outside surface of the frame cover 230 is depicted in FIG. 2 by the shaded areas. In this embodiment, the frame cover is attached to the front closure, which, in the closed position, affixes the frame cover in place on the front side 232 of the animal training device, thereby restricting ingress and egress through the front side to and from the containment cavity. Similarly, the frame cover is attached to the top closure, which, in the closed position, affixes the frame cover in place on the top side 233 of the animal training device, thereby restricting ingress and egress through the top side to and from the containment cavity. The portions of the frame cover in place on the front and top sides of the substantially rigid frame are aperture covers.

The second embodiment of the frame cover 230 is held in place along the rear side (not visible from the perspective shown) and top side of the animal training device by use of disengageable snaps 234, that reversibly attach the frame cover to the substantially rigid frame 201. Some variations also utilize disengageable snaps disposed along the front side, to secure the frame cover in place on the substantially rigid frame. The head aperture 235, adapted to allow an animal's head to extend outside the containment cavity with the animal contained therein, resides between the front closure 218 and the top closure 219.

Where the animal training device 200 is configured as in FIG. 2, with the front and top closures 218 and 219 in their closed positions and the frame cover 230 fully attached to the substantially rigid frame 201, access to and from the containment cavity is substantially blocked; an animal in the containment cavity in this configuration of the animal training device is substantially confined to the device.

Figure 3:
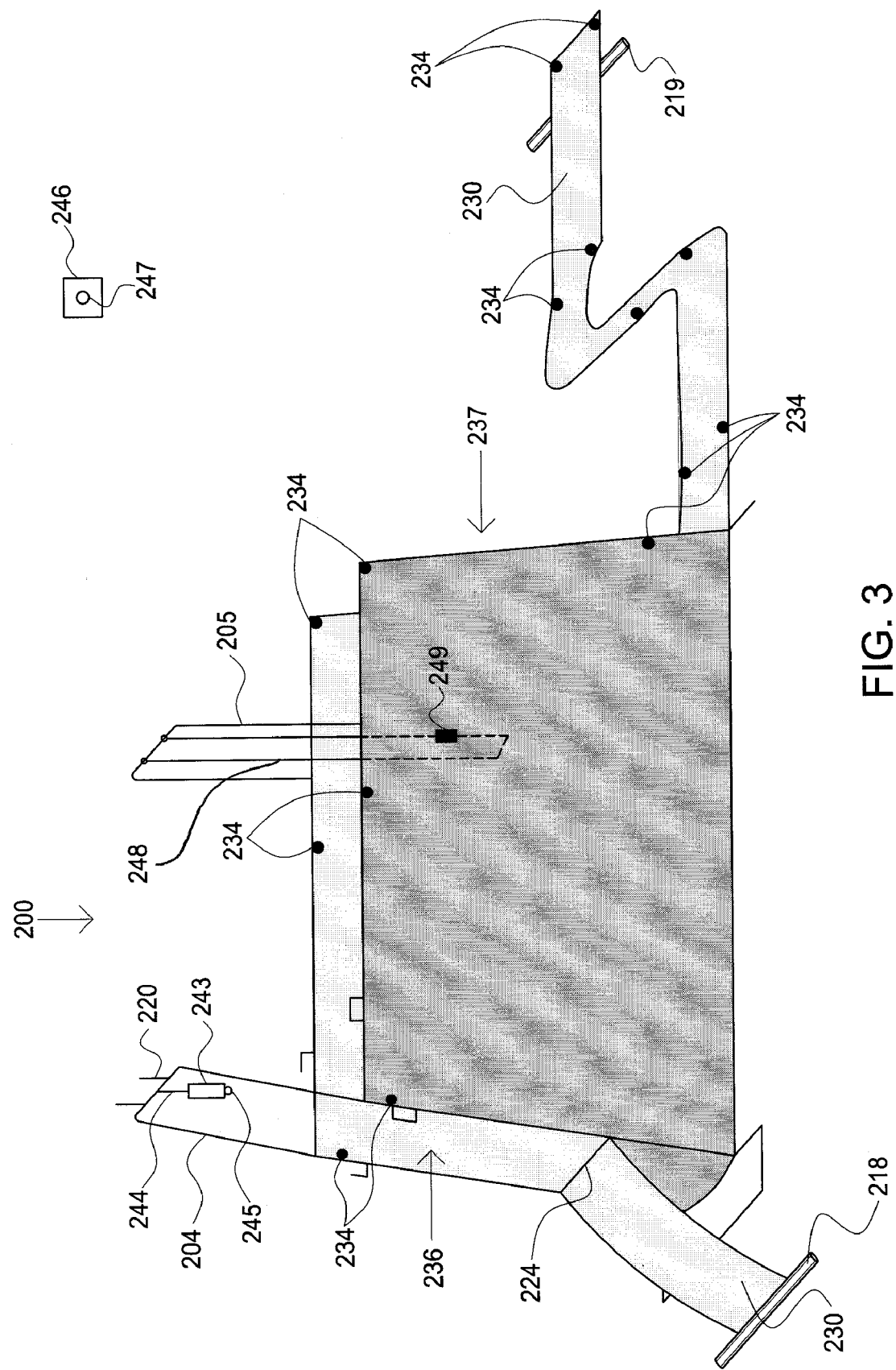
FIG. 3 is an isometric view of an animal training device with the frame cover partially detached and closures in the open position, according to one embodiment of the present invention.

FIG. 3 illustrates an embodiment of the animal training device 200 with the frame cover 230 partially removed from the substantially rigid frame 201. The disengageable snaps 234 are in a disengaged, or unattached, configuration, and the front closure 218 and top closure 219 are in their open (unattached) positions. With the animal training device so configured, access to and from the containment cavity is substantially unimpeded through the rear opening 237 of the device. Access to and from the containment cavity through the front opening 236 is partially obstructed by the foot boundary bar 224. The foot boundary bar encourages an animal to stop and remain in the containment cavity, in some embodiments of the animal training device.

An animal in the containment cavity in this configuration of the animal training device may still be substantially restrained by affixing a leash to the animal and to the device. The leash is typically, but not necessarily, attached to and held in position on the animal training device by the front upper structural member 204, the leash guides 220, or the rear upper structural member 205. This embodiment further comprises a belly sling 248 adapted to run beneath an animal's abdomen while the animal is in the containment cavity. In this embodiment, the ends of the sling are affixed to the rear upper structural member 205. A fastener 249, adapted to connecting or disconnecting the sling beneath the animals abdomen, is disposed at a point along the length of the sling. In some embodiments the fastener is adapted to being disconnected using a remote release mechanism.

The embodiment illustrated in FIG. 3 further comprises a wireless remote release mechanism that includes a receiver 243 and a transmitter 246. The receiver is disposed on a short lead assembly 244, attached to the front upper structural member 204, that is adapted to secure a dog's collar or harness to the animal training device 200. Upon receiving a signal from the transmitter, the receiver in this embodiment releases a clasp 245 adapted to engage a dog's collar or harness. The transmitter in this embodiment is activated by pressing a release button 247, whereupon the transmitter wirelessly emits the signal, which is detected by the receiver. The signal is typically, but not necessarily, in the form of electromagnetic radiation. In this embodiment, the wireless remote release mechanism is adapted to allow a trainer or handler, from a location distal to the animal training device, to release an animal from restraint imposed on the animal by the short lead assembly 244. Variations include remote release mechanisms that affect the closures or the belly sling.

A Third Embodiment Animal Training Device

Figure 4:
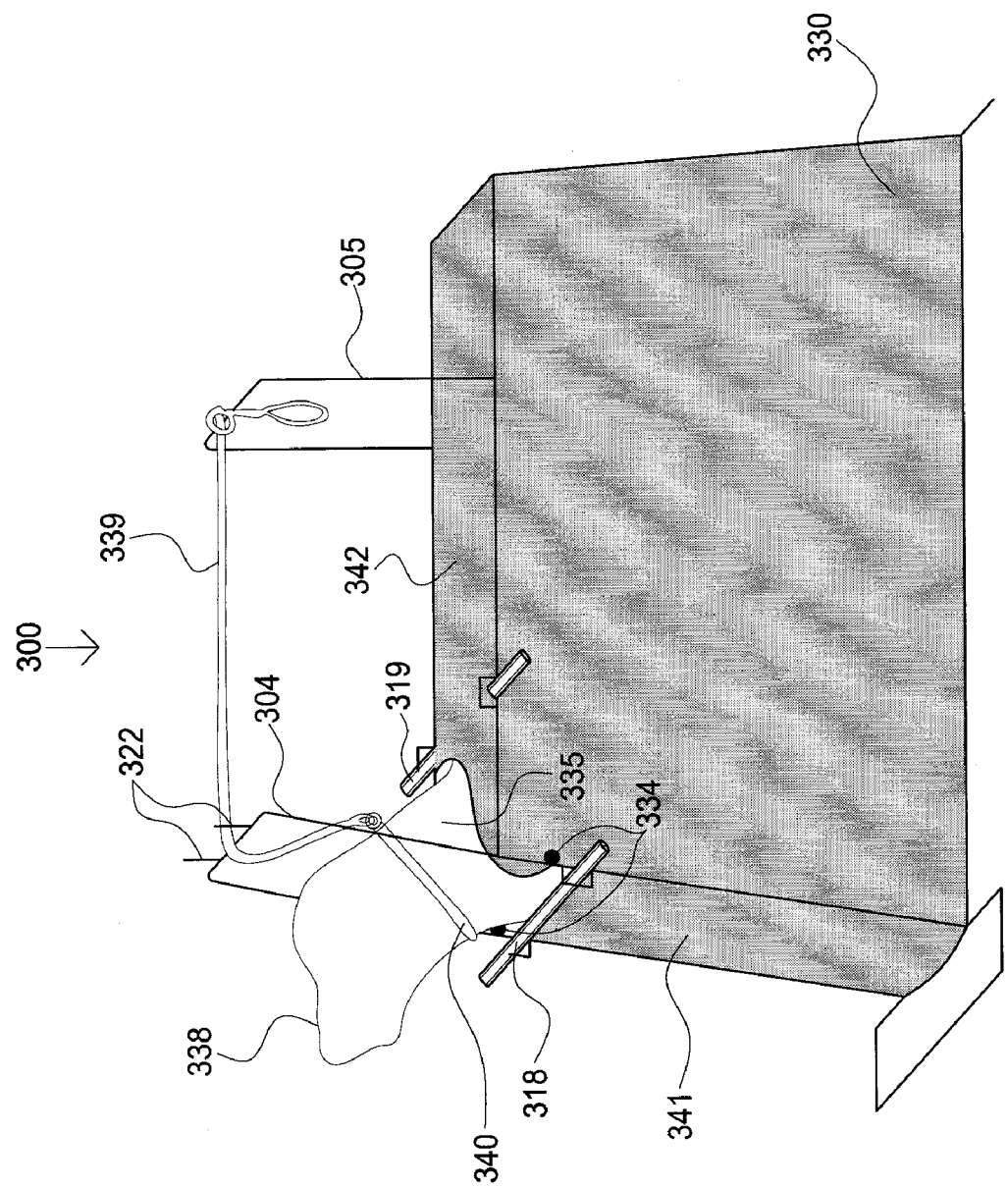
FIG. 4 is an isometric view of an animal training device with the frame cover fully attached, and closures in the closed position, and a dog in the containment cavity, according to one embodiment of the present invention.

FIG. 4 illustrates a third embodiment animal training device 300 with a dog present in the containment cavity, and the dog's head 338 and neck extending out of a head aperture 335. A leash 339 attached on one end to a dog's collar 340 runs through leash guides 322 atop the front upper structural member 304 in this embodiment. The angles formed along the front side by the intersections of the front upper structural member 304 with the front upright frame members 314, 315 is greater than 180 degrees in this embodiment. The leash is affixed to the rear upper structural member 305.

The third embodiment further comprises a front closure 318 and a top closure 319, both of which are illustrated in the closed position in FIG. 4. The frame cover 330 is reversibly secured in place on all sides of the device in this embodiment, and serves as a front aperture cover 341, a top aperture cover 342, and a rear aperture cover (not visible from this view) where it covers front, top, and rear openings, respectively. The top aperture cover in this embodiment extends over the top closure 319 to partially encircle the dog's neck; one end of the top aperture cover is reversibly secured in place on the front side of the animal training device with disengageable snaps 334. In this embodiment, the dog is restrained within the containment cavity by the front and top closures in the closed position, the front, top, and rear aperture covers secured in place over their respective openings, and the leash. The dog's head is held in a desirable position by the configuration of the leash running through the leash guides 322.

A Fourth Embodiment Animal Training Device

Figure 5:
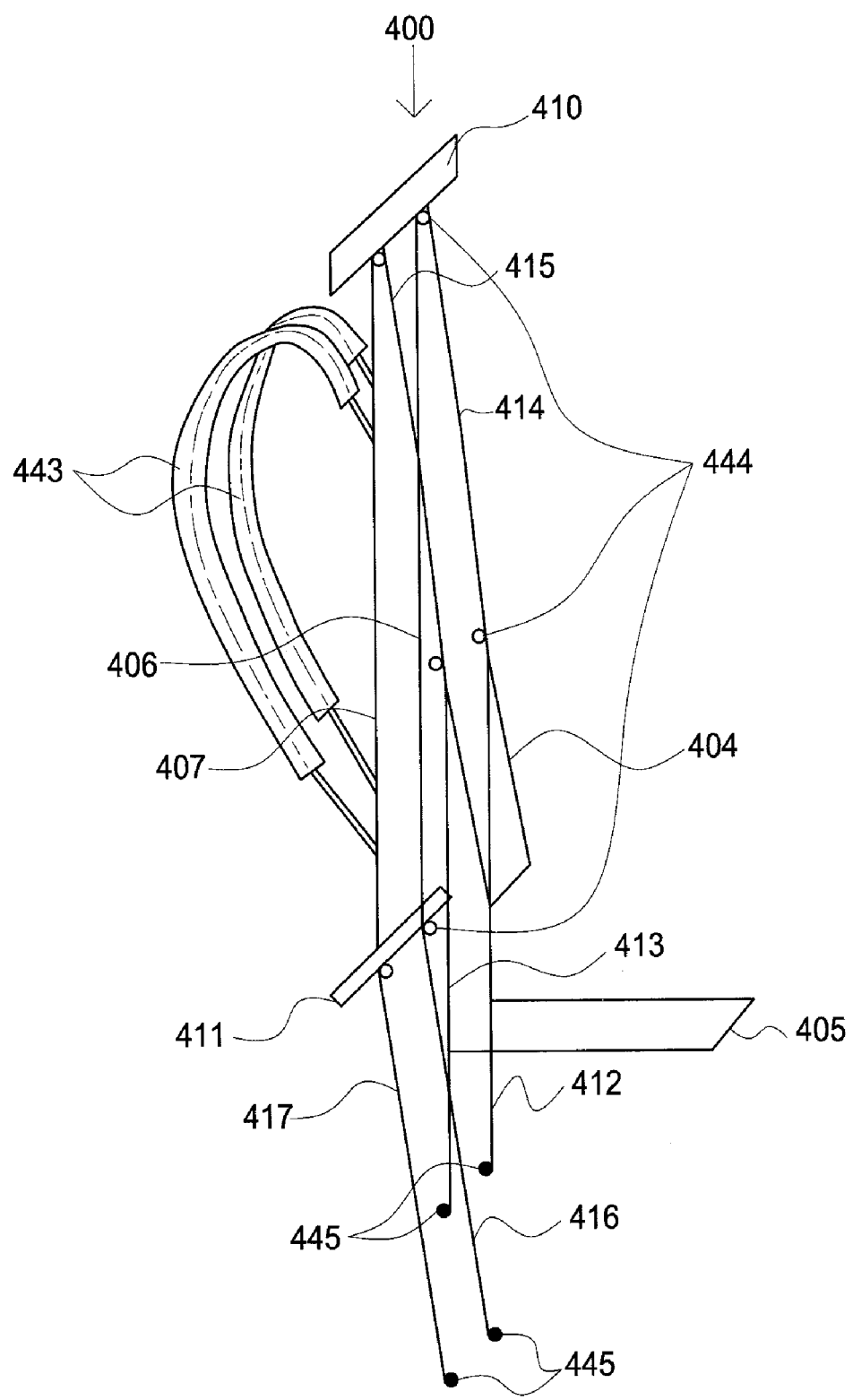
FIG. 5 is an isometric view of an animal training device in a folded position, showing backpack style shoulder straps, according to one embodiment of the present invention.

A fourth embodiment animal training device 400 is illustrated folded into a relatively compact configuration in FIG. 5. The fourth embodiment comprises backpack style shoulder straps 443 to facilitate wearing the animal training device on a person's back. The fourth embodiment further comprises variable angle junctions 444 that enable the animal training device to fold into a relatively compact configuration. A relatively compact configuration is desirable in some instances for storing, transporting, or carrying the animal training device. In this embodiment, folding is further facilitated by separable junctions 445 that allow the longitudinal frame members (left 412 and right 413) to disconnect from the rear upright frame members (left 416 and right 417) at the separable junctions. The fourth embodiment further comprises front upright frame members (left 414 and right 415), longitudinal base members (left 406 and right 407), upper structural members (front 404 and rear 405), and stability modulators (front 410 and rear 411).

A Fifth Embodiment Animal Training Device

Figure 6:
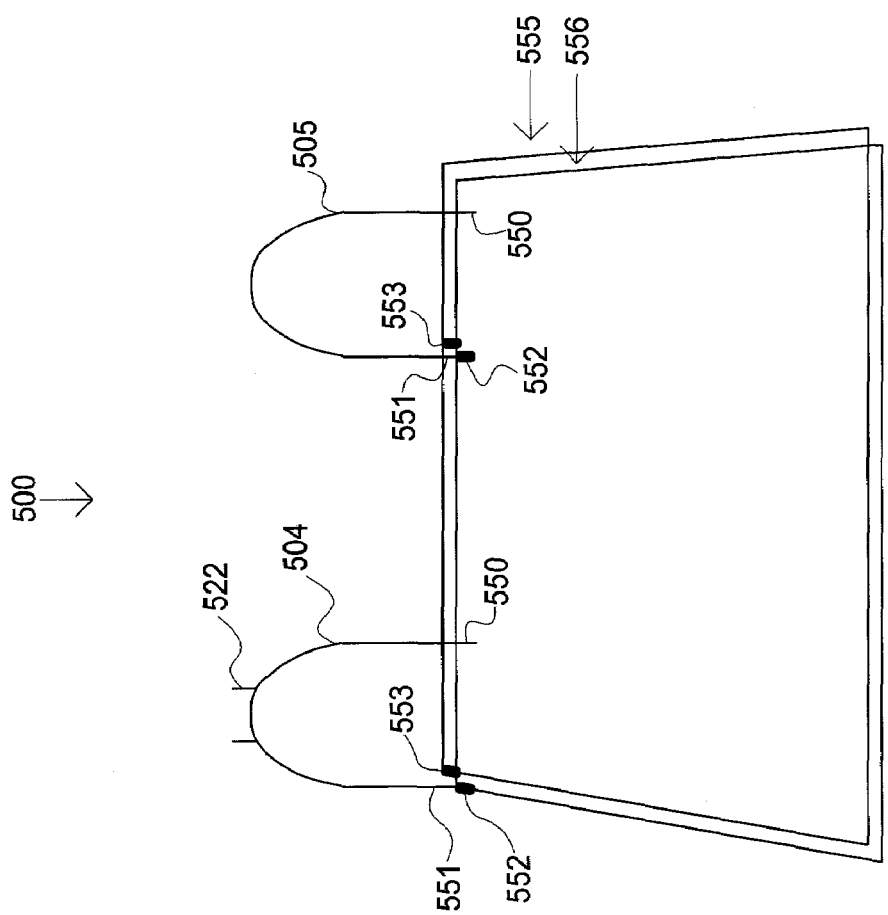
FIG. 6 is an isometric view of an animal training device in a relatively compact position, according to one embodiment of the present invention.

FIG. 6 illustrates a fifth embodiment animal training device 500. The fifth embodiment comprises a front upper structural member 504 and a rear upper structural member 505, each of which have disengageable ends 550. The disengageable ends connect and disconnect from upper structural member receptacles 553 disposed on a left rigid frame assembly 555 to allow the animal training device to collapse into a relatively compact configuration. FIG. 6 illustrates the fifth embodiment with the disengageable ends disconnected from the left rigid frame assembly and the animal training device in a relatively compact configuration. The front and rear upper structural members have sessile ends 551 that fit into sockets 552 disposed on the right rigid frame assembly. The sessile ends can rotate within the sockets to allow the upper structural members to pivot.

FIG. 6 illustrates the fifth embodiment with the upper structural members positioned in the plane of the right rigid frame assembly. The left and right rigid frame assemblies lie substantially parallel and in direct contact in the relatively compact configuration shown in FIG. 6 of this embodiment.

Structures that hold the left and right rigid frame assemblies apart to create a containment cavity in an uncollapsed configuration must be removed or repositioned to allow this embodiment to collapse into a relatively compact configuration. Structures illustrated in other figures that are not illustrated in FIG. 6, because the structures have been removed to facilitate a relatively compact configuration in this embodiment, include front and rear stability modulators, a front lateral base member, front and top closures, and a foot boundary bar. Alternatively, in other embodiments, some or all of these structures are repositioned, rather than removed, to facilitate a relatively compact configuration. In some embodiments, such repositioning is enabled by use of variable angle junctions or other adjustable connections. Structures that have been repositioned to facilitate a relatively compact configuration in this embodiment include the front upper structural member 504 and rear upper structural member 505.

Alternatively, in other embodiments, the upper structural members could be removed to facilitate a relatively compact configuration.

The relatively compact configuration illustrated in FIG. 6 is adapted to storing the animal training device in an unobtrusive, space saving manner. The relatively compact configuration illustrated in FIG. 5 is adapted to carrying the device on a user's back, and is also amenable to storing the animal training device unobtrusively. These relatively compact configurations are illustrative only; other relatively compact configurations are contemplated for various embodiments of the animal training device.

An Embodiment of a Method of Using an Animal Training Device

Figure 7:
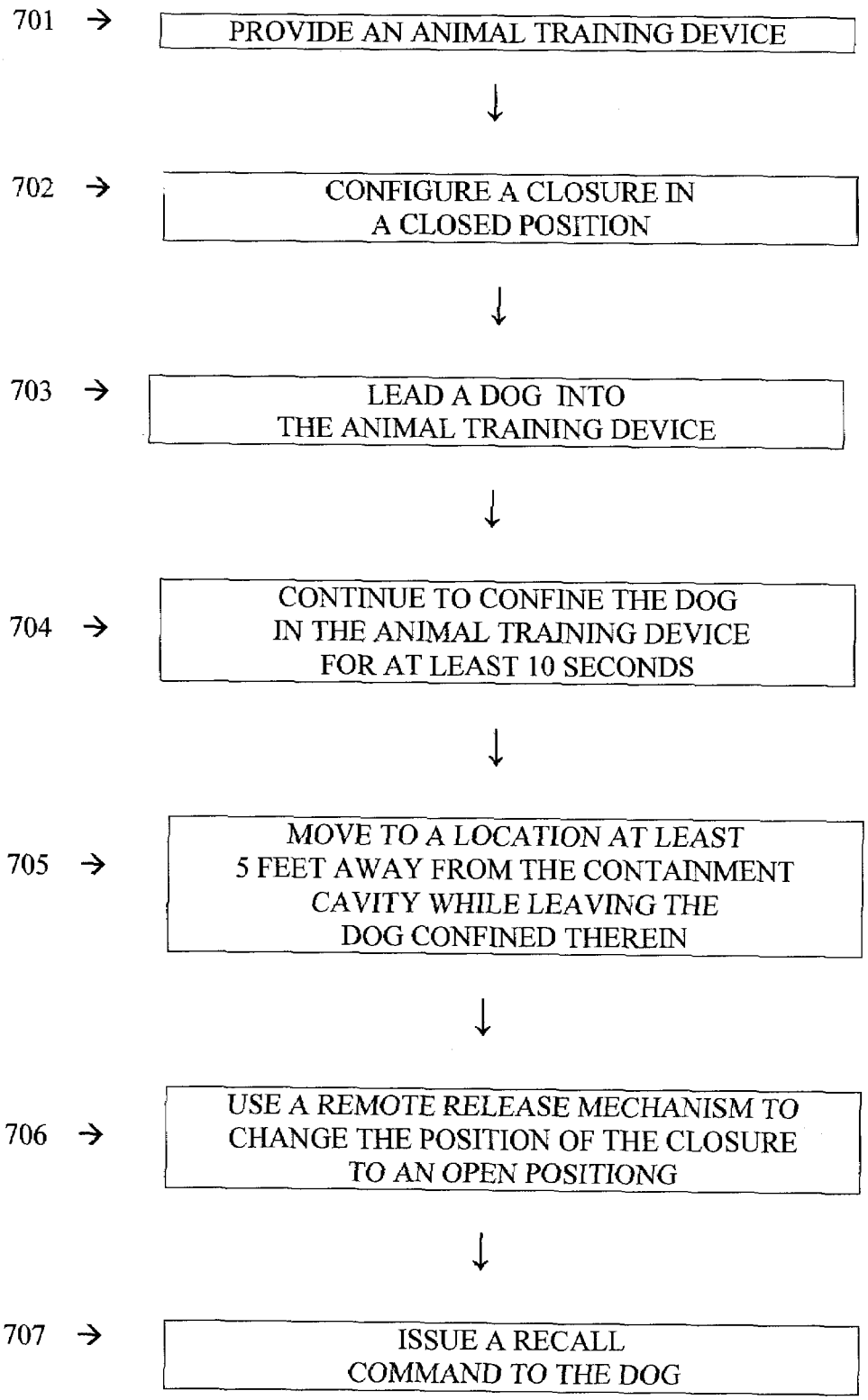
FIG. 7 is a flow chart illustrating a method of training a dog using an animal training device, according to one embodiment of the present invention.

FIG. 7 illustrates one embodiment of a method of using the animal training device to train a dog. The first operation 701 of this embodiment comprises providing an animal training device with an opening at the rear side of the containment cavity, a closure on an opening at the front side of the containment cavity, and a remote release mechanism that changes the closure from a closed to an open position.

The second operation 702 of this embodiment comprises configuring the front closure in the closed position. In some embodiments, a top closure is configured in the open position, and a frame cover is configured detached from top and rear sides of the device.

The third operation 703 of this embodiment comprises leading a dog on a leash into the containment cavity through the open rear side, whereupon the dog stops when prevented by the front closure from exiting the cavity through the front side. Some embodiments further comprise issuing a command to the dog to sit or stay. The leash is typically configured along the upper structural members, using one or more leash guides to properly align the leash. In some embodiments, when properly configured and attached to both the upper structural members and the dog's collar, the leash secures the dog in the containment cavity and encourages the dog to hold its head up in a desirable position. In some embodiments, the leash is disconnected from the dog's collar and the collar is connected to a remote release mechanism that similarly restrains the dog in the containment cavity and encourages the dog to hold its head is a desirable position. Under these circumstances, the dog is readily accessible through the open top of the device for petting or praise by a human handler. With some embodiments, a belly sling is positioned snugly beneath the dog's abdomen, in front of and proximate to the dog's rear legs, in order to encourage the dog to remain standing. Use of the belly sling is desirable when training a pointing dog, such as a setter or pointer, to stand and hold a point.

The fourth operation 704 of this embodiment comprises continuing to confine the dog in the animal training device for at least 10 seconds. Some embodiments comprise keeping the dog confined for much longer intervals.

The fifth operation 705 of an embodiment comprises moving to a location at least 5 feet away from the containment cavity while the dog remains confined in the cavity. Some embodiments comprise moving to a location much farther than 5 feet from the containment cavity, and some comprise staying in close proximity to the containment cavity. The dog may fidget or try to escape under these circumstances, but such conduct is discouraged because it causes the device to rock. Animals generally find the rocking sensation unpleasant. More vigorous activity or escape attempts may cause the device to topple, which a dog will likely find most unpleasant. Thus, the dog quickly learns to remain relatively still in the animal training device, and does not associate unpleasant corrective action with the trainer.

The sixth operation 706 of this embodiment comprises using a remote release mechanism to change the position of the closure on the front opening to an open position, thereby enabling to dog to exit the containment cavity through the front opening. Some embodiments comprise using the remote release mechanism to release a snap attached to the dog's collar. Some embodiments comprise using a remote release mechanism to release a belly sling from its position snugly against the dog's abdomen. Upon release, a dog will typically leave the device and perform an act such as retrieving an object or coming directly to the trainer.

The seventh operation 707 of an embodiment comprises issuing a recall command to the dog. The recall command is typically, but not necessarily, issued simultaneously with opening the front closure 706, or shortly thereafter. Some embodiments comprise issuing other commands, such as, but not limited to, retrieve commands. Typically, the dog exits the containment cavity in response to opening the front closure and issuing the recall or other command.

In some embodiments, the animal training device is used in the field as a blind, the top closure is typically placed in the closed position, and the frame cover is affixed in place on the rear and top sides of the substantially rigid frame while the dog is in the containment cavity. So configured, the device substantially conceals the dog. A hunter/trainer typically leaves the dog concealed in the device while the hunter hides at the same or a different location. The hunter/trainer typically releases the dog to retrieve downed prey. Remote release is typically used where the hunter/trainer is distal to the animal training device.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. An animal training device comprising:
   a containment cavity, the containment cavity being substantially enclosed and adapted to contain a dog;
   a first opening and a second opening, the first and second openings being adapted to allow passage into or out of the containment cavity by the dog, the first opening being disposed at a front side of the containment cavity and the second opening being disposed at a rear side of the containment cavity;
   a marginally unstable base, the marginally unstable base residing beneath the containment cavity and comprising a downwardly bowed portion, the downwardly bowed portion making the animal training device predisposed to rocking when mildly physically disturbed;
   a substantially rigid frame, the substantially rigid frame residing at a periphery of the containment cavity and comprising two longitudinal frame members, each of the two longitudinal frame members being disposed substantially horizontally, and being directly coupled to one or more front upright frame members and one or more rear upright frame members, the one or more upright front frame members being disposed at a front side of the containment cavity and being directly coupled to and projecting upwardly from the marginally unstable base, and the one or more rear upright frame members being disposed at a rear side of the containment cavity and being directly coupled to and projecting upwardly from the marginally unstable base, the front side and the rear side being opposite sides of the containment cavity; and a first closure, the first closure having a first position and a second position, the first position being adapted to substantially block passage into or out of the containment cavity by the dog, and the second position being adapted to permit passage into or out of the containment cavity by the dog.

2. A method of training a dog comprising:
providing the animal training device of claim 1;
leading the dog into the containment cavity through the second opening; and
issuing a command to the dog, wherein the dog exits the containment cavity through the first opening in response to the command.

3. A method of training a dog comprising:
providing the animal training device of claim 1;
leading the dog into the containment cavity while the first closure is in the first position.

4. The method of claim 3, further comprising adjusting the first closure from the first position to the second position while the dog is in the containment cavity.

5. The method of claim 4, further comprising allowing the dog to exit the containment cavity through the first opening.

6. An animal training combination comprising:
the animal training device of claim 1;
a dog, a body of the dog residing within the containment cavity and a head of the dog residing outside the containment cavity.

7. The animal training combination of claim 6, wherein the animal training device further comprises:
an upper structural member, the upper structural member being coupled directly to the substantially rigid frame and a top portion of the upper structural member residing higher than the head of the dog.

8. The animal training combination of claim 7, further comprising:
a leash, the leash being coupled to the dog and a portion of the leash being in contact with the upper structural member.

9. The animal training combination of claim 8, wherein the leash is coupled directly to the top portion of the upper structural member.

10. An animal training combination comprising:
an animal;
an animal training device, the animal training device comprising:
a containment cavity, the containment cavity being enclosed by a cover and the animal being confined in the containment cavity and a head of the animal projecting outside the containment cavity;
a marginally unstable base, the marginally unstable base residing beneath the containment cavity and being prone to rocking when mildly physically disturbed;
a first opening and a second opening, the first opening residing at a front side of the containment cavity and being adapted to permit passage of the animal through the first opening into the containment cavity, and the second opening residing at a rear side of the containment cavity and being adapted to permit passage of the animal through the second opening into the containment cavity, the front side and the rear side being opposite sides of the containment cavity; and
a first closure, the first closure having a first closure first position and a first closure second position, the first closure first position being adapted to substantially block passage out of the containment cavity through the first opening by the animal, and the first closure second position being adapted to permit passage out of the containment cavity through the first opening by the animal; and
a second closure, the second closure having a second closure first position and a second closure second position, the second closure first position being adapted to substantially block passage out of the containment cavity through the second opening by the animal, and the second closure second position being adapted to permit passage out of the containment cavity through the second opening by the animal.

11. The animal training combination of claim 10, wherein the animal training device further comprises an upper structural member, a top portion of the upper structural member residing above the head of the animal.

12. The animal training combination of claim 11, wherein:
the animal is standing in the containment cavity; and
the animal training device further comprises a sling, the sling being coupled to the upper structural member and extending under an abdomen of the animal.

13. The animal training combination of claim 12, wherein the sling fits snug against the abdomen of the animal.

\* \* \* \* \*